(12) United States Patent
Conley et al.

(10) Patent No.: US 9,695,979 B2
(45) Date of Patent: Jul. 4, 2017

(54) METHOD OF CONTROLLING BEARING LUBRICATION SYSTEM

(71) Applicants: Paul George Conley, St. Charles, MO (US); Bryan Uncapher, Grayslake, IL (US); Joe T Inciong, Skokie, IL (US)

(72) Inventors: Paul George Conley, St. Charles, MO (US); Bryan Uncapher, Grayslake, IL (US); Joe T Inciong, Skokie, IL (US)

(73) Assignee: LINCOLN INDUSTRIAL CORPORATION, St. Louis, MO (US)

( * ) Notice: Subject to any disclaimer, the term of this patent is extended or adjusted under 35 U.S.C. 154(b) by 254 days.

(21) Appl. No.: 14/580,824

(22) Filed: Dec. 23, 2014

(65) Prior Publication Data

US 2016/0178122 A1    Jun. 23, 2016

(51) Int. Cl.
*F16N 29/02* (2006.01)
*F16C 33/66* (2006.01)

(52) U.S. Cl.
CPC .......... *F16N 29/02* (2013.01); *F16C 33/6659* (2013.01); *F16N 2200/20* (2013.01); *F16N 2250/00* (2013.01); *F16N 2250/08* (2013.01); *F16N 2250/16* (2013.01)

(58) Field of Classification Search
CPC ............................. F16N 29/02; F16C 33/6659
USPC ........................................................ 184/7.4
See application file for complete search history.

(56) References Cited

U.S. PATENT DOCUMENTS

| | | | |
|---|---|---|---|
| 4,738,336 A | | 4/1988 | Smith et al. |
| 5,020,636 A | * | 6/1991 | Daeges ................. F04B 43/095 184/55.1 |
| 5,060,760 A | | 10/1991 | Long et al. |
| 5,080,195 A | * | 1/1992 | Mizumoto .......... F16C 33/6622 184/104.1 |
| 5,526,783 A | | 6/1996 | Ito et al. |
| 5,671,825 A | | 9/1997 | Wong et al. |
| 5,813,496 A | | 9/1998 | Hyvonen et al. |
| 5,911,289 A | | 6/1999 | Waller |
| 5,921,350 A | | 7/1999 | Tsai |
| 5,952,803 A | | 9/1999 | Canada et al. |
| 5,969,601 A | | 10/1999 | Sato et al. |

(Continued)

FOREIGN PATENT DOCUMENTS

| | | |
|---|---|---|
| CN | 103148107 A | 6/2013 |
| DE | 20107630 | 10/2001 |

(Continued)

*Primary Examiner* — Michael Riegelman
(74) *Attorney, Agent, or Firm* — Mark Ussai; SKF USA Inc, Patent Dept.

(57) ABSTRACT

A method includes providing a bearing housing configured to house a bearing, the bearing housing enclosing a free volume for receiving lubricant, providing a quantity of the lubricant in the free volume, and providing a sensor configured to measure at least one parameter affecting a degradation rate at which the lubricant will degrade and to produce at least one output signal indicative of the measured at least one parameter. The method also includes providing a pump for pumping lubricant into the bearing housing, providing a controller configured to receive the at least one output signal from the sensor and configured to control the pump based the received at least one output signal, and controlling the pump based on a function of the received at least one output signal.

15 Claims, 6 Drawing Sheets

(56) References Cited

U.S. PATENT DOCUMENTS

| | | | | |
|---|---|---|---|---|
| 6,008,724 | A | 12/1999 | Thompson | |
| 6,101,427 | A | 8/2000 | Yang | |
| 6,125,969 | A | 10/2000 | Graf et al. | |
| 6,161,962 | A | 12/2000 | French et al. | |
| 6,189,656 | B1 | 2/2001 | Morgenstern et al. | |
| 6,196,057 | B1 | 3/2001 | Discenzo | |
| 6,216,822 | B1 | 4/2001 | May et al. | |
| 6,253,601 | B1 | 7/2001 | Wang et al. | |
| 6,286,363 | B1 | 9/2001 | Discenzo | |
| 6,324,899 | B1 | 12/2001 | Discenzo | |
| 6,447,573 | B1 * | 9/2002 | Rake | F16N 29/02 95/10 |
| 7,017,712 | B1 | 3/2006 | Rake et al. | |
| 7,018,106 | B2 | 3/2006 | Okada | |
| 7,140,468 | B2 | 11/2006 | Rake et al. | |
| 7,293,919 | B2 * | 11/2007 | Ueno | F04B 23/025 384/462 |
| 7,374,019 | B2 * | 5/2008 | Kosugi | B23Q 11/122 184/6.14 |
| 7,665,577 | B2 | 2/2010 | Javelly et al. | |
| 8,123,493 | B2 * | 2/2012 | Yoshimura | F01C 21/04 184/6.16 |
| 8,479,886 | B2 | 7/2013 | Tokuyama et al. | |
| 8,668,050 | B2 | 3/2014 | Tokuyama et al. | |
| 8,887,868 | B2 * | 11/2014 | Takayanagi | F03D 7/026 184/4 |
| 9,335,317 | B2 * | 5/2016 | Matsubara | G01M 13/04 |
| 9,377,053 | B2 * | 6/2016 | Ito | F16C 33/664 |
| 2003/0015374 | A1 | 1/2003 | Matsuura et al. | |
| 2003/0110860 | A1 | 6/2003 | Okada | |
| 2003/0115977 | A1 | 6/2003 | Holweg et al. | |
| 2004/0197040 | A1 | 10/2004 | Walker et al. | |
| 2005/0241880 | A1 * | 11/2005 | Nawamoto | B23Q 1/70 184/6 |
| 2007/0030162 | A1 | 2/2007 | Okada et al. | |
| 2012/0221153 | A1 | 8/2012 | Emlind et al. | |
| 2013/0015019 | A1 | 1/2013 | Kuvaja et al. | |
| 2013/0277148 | A1 | 10/2013 | Beck et al. | |
| 2014/0238742 | A1 * | 8/2014 | Borek | F16N 29/02 175/40 |
| 2016/0084313 | A1 * | 3/2016 | Oomoto | F16C 33/6674 384/471 |
| 2016/0178121 | A1 * | 6/2016 | Conley | F16N 29/02 184/26 |
| 2016/0186811 | A1 * | 6/2016 | Conley | F16N 29/02 184/6.1 |
| 2016/0186812 | A1 * | 6/2016 | Conley | F16N 29/02 184/6.1 |

FOREIGN PATENT DOCUMENTS

| | | |
|---|---|---|
| DE | 10059797 A1 | 6/2002 |
| EP | 1277977 B1 | 8/2006 |
| EP | 1801415 B1 | 6/2014 |

* cited by examiner

METHOD OF CONTROLLING BEARING LUBRICATION SYSTEM

TECHNOLOGICAL FIELD

The present disclosure is directed to a method of controlling a bearing lubrication system, and more specifically, toward a method of controlling a bearing lubrication system based on a degradation rate of a lubricant in the bearing housing.

BACKGROUND

Automatic lubrication systems are known that include mechanical dosing and pumping components. These components may be configured to provide a fixed dose of lubricant (grease or oil or other suitable lubricant, referred to hereinafter generally as "grease") at predetermined intervals. The intervals and doses are conventionally set by manually adjusting each of the individual dosing devices. A lubrication system that provides a greater degree of control and more automated control over lubricant dosing is disclosed in U.S. Patent Application Publication No. 2013/0015019 A1 for an "Advanced Lubrication System," which disclosure is hereby incorporated by reference.

Conventional lubrication systems are generally configured to provide lubricant based on the needs of the bearing or component being lubricated. These systems have not heretofore taken into account the changing lubricating properties of the grease over is useful life or the fact that the lubricating properties of the grease may change as the operating conditions of the device being lubricated change. Conventional lubrication systems therefore may provide too much grease under some conditions and may under-lubricate under other conditions when the breakdown or degradation rate of the grease is not adequately accounted for.

It would therefore be desirable to provide an automated lubrication system that controls lubrication based on one or more parameters that affect the degradation rate of the lubricant.

SUMMARY

This problem and others are addressed by the present disclosure, a first aspect of which comprises a method that includes providing a bearing housing configured to house a bearing, the bearing housing enclosing a free volume for receiving lubricant, providing a quantity of the lubricant in the free volume, and providing a sensor configured to measure at least one parameter affecting a degradation rate at which the lubricant will degrade and to produce at least one output signal indicative of the measured at least one parameter. The method also includes providing a pump for pumping lubricant into the bearing housing, providing a controller configured to receive the at least one output signal from the sensor and configured to control the pump based the received at least one output signal, and controlling the pump based on a function of the received at least one output signal.

Another aspect of the disclosure comprises a method including providing a bearing housing configured to house a bearing, the bearing housing enclosing a free volume for receiving lubricant, placing the lubricant in the free volume, providing a sensor configured to measure a moisture content of the lubricant and to produce at least one output signal indicative the measured moisture content and providing a pump for pumping lubricant into the bearing housing. The method also includes providing a controller configured to receive the at least one output signal from the sensor, determine from the at least one output signal whether the moisture level is above or below a first level and control the pump based on the determined moisture level. In addition, the method includes pumping lubricant into the bearing housing at a first rate in response to a determination that the moisture content is below a first level and pumping lubricant into the bearing housing at a second rate, greater than the first rate, in response to a determination that the moisture content is at or above the first level.

BRIEF DESCRIPTION OF THE DRAWINGS

These and other aspects and features of the disclosure will be better understood after a reading of the following detailed description in connection with the attached drawings, wherein.

DETAILED DESCRIPTION

Figure 1:
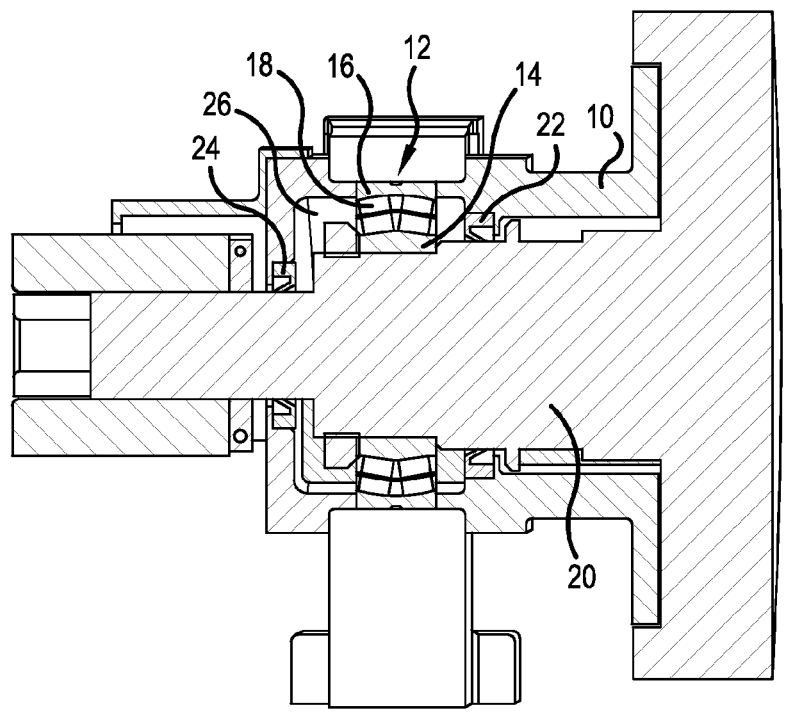
FIG. 1 is a schematic side elevational view of a bearing housing including a bearing that can be lubricated with an embodiment of the present disclosure.

Referring now to the drawings, wherein the showings are for the purpose of illustrating presently preferred embodiments of the disclosure only and not for the purpose of limiting same, FIG. 1 illustrates a housing 10 containing a bearing assembly 12 that includes an inner ring 14, an outer ring 16 and a plurality of rolling elements 18 between the inner ring 14 and the outer ring 16. The bearing assembly 12 supports a shaft 20 for rotation relative to the housing 10, and an inner seal 22 and an outer seal 24 seal a free volume 26 inside the housing, which free volume 26 is completely or substantially filled with a lubricant, such as grease. The free volume 26 includes the spaces inside the bearing assembly 12 where the grease makes contact with the rolling elements 18, the region immediately adjacent to the shaft 20 where the grease is churned when the shaft 20 rotates, and the regions axially away from the bearing assembly 12 and radially away from the shaft 20 where the grease does not actively perform a lubricating function but where it is available to move into contact with the bearing assembly 12 or the shaft 20 as the shaft 20 and roller elements 18 move in the housing 10 and mix the lubricant.

The inner seal 22 and the outer seal 24 are preferably exclusion seals, that is, seals specifically configured to keep debris and contaminants out of the free volume 26 and away from the bearing assembly 12. Such seals may allow some amount of grease leakage from the free volume 26 when the seals are worn. This is in contrast to an inclusion seal that is primarily configured to prevent the escape of any grease. The inner and outer seals 22, 24 are substantially identical.

When the bearing housing 10 is used in dirty or highly contaminated environments, in the mining field and various industrial settings, contaminants may come into contact with the inner and outer seals 22, 24 and/or the shaft 20 near the outer seal 24. Allowing a small amount of grease to escape from the outer seal 24 helps drive these contaminants outwardly away from the seal 24 before they reach the free volume 26 where they could mix with the grease in the bearing housing 10 and damage the bearing assembly 12. The bearing housing 10 also includes a lubrication inlet 28 (illustrated in FIGS. 2-4) via which grease can be added to the free volume 26, and a pressure relief valve (not illustrated) that opens to release grease from the free volume 26 when the pressure in the free volume 26 increases beyond a predetermined level, 5 psi, for example. Increasing the pressure in the housing 10 to approximately 5 psi may also drive a small amount of the grease out of the free volume 26 between the inner and outer seals 22, 24 and the shaft 20 if the inner and outer seals 22, 24 are significantly worn. In the case of new inner and outer seals 22, 24, however, all grease would exit via the pressure relief valve.

Figure 2:
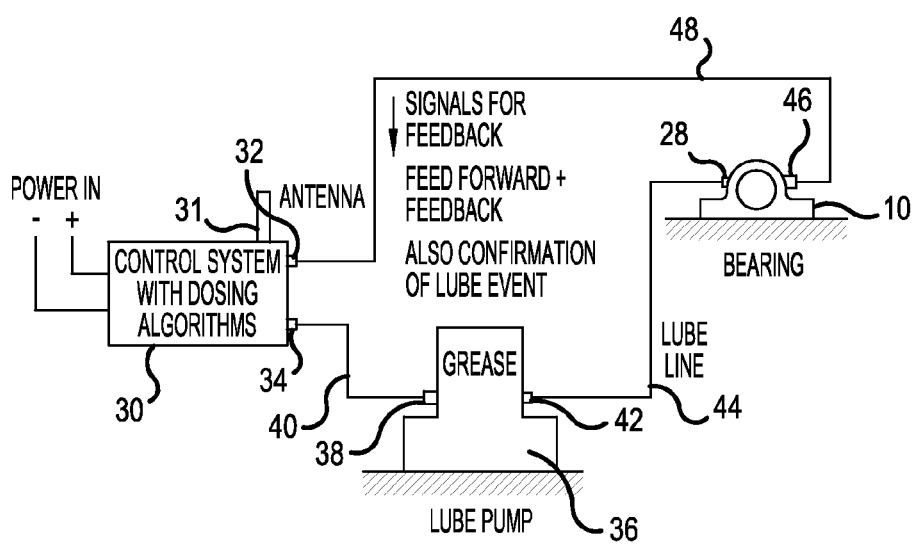
FIG. 2 is a schematic diagram of a first embodiment of a lubrication system according to the present disclosure including the bearing housing of FIG. 1.

FIG. 2 schematically illustrates the bearing housing 10 of FIG. 1 in a lubrication system according to an embodiment of the present disclosure. The lubrication system includes a controller 30 having at least one signal input 32 and at least one signal output 34, a lubrication pump 36 and the bearing housing 10 described above in connection with FIG. 1. The lubrication pump 36 includes a signal input 38 connected to the at least one signal output 34 of the controller 30 by a lubrication signal output line 40, and a grease outlet 42 connected to the lubrication inlet 28 on the bearing housing 10 by a lubrication line 44.

A sensor 46 is mounted on the bearing housing 10 and configured to sense one or more conditions associated with the bearing housing 10 and the grease in the free volume 26 of the bearing housing 10 which conditions affect a rate at which the grease breaks down and begins to lose its lubricating ability. This rate may be referred to hereinafter as the "degradation rate" of the grease. These sensed conditions may include one or more of: a rotation speed of the shaft 20 (which may also be referred to herein as a rotation or operating speed of the bearing assembly 12), a temperature of the grease in the free volume 26, a pressure of the grease in the free volume 26, and a moisture content of the grease in the free volume 26. The sensor 46 produces one or more output signals on sensor output line 48 which sensor output line 48 is connected to the signal input 32 of the controller 30, and the one or more output signals are indicative of one or more of the aforementioned sensed conditions.

As used herein, the phrase "degradation rate" may, but does not necessarily, refer to a rate having a numeric value, as in "the lubricant is degrading at a rate of x units per hour." Instead, the rate may be relative, as in "fast or slow", or "fast, moderate or slow," or "fast" and "slow" with more than one intermediate description. The meaning of these terms will vary with the grease under consideration. However, greases are selected based on their properties, and some are known to last longer than others. Changing conditions will affect how long the grease will perform in a satisfactory manner. For example, at low shaft speeds, the degradation rate of a lubricant may be characterized as "slow." Increasing the temperature may hasten the degradation of the grease so that the degradation rate becoms "moderate." Thereafter increasing shaft speed at the elevated temperature may make the degradation rate "fast." Determining a degradation rate under certain conditions therefore constitutes a determination as to how long a particular grease is expected to maintain satisfactory lubrication properties.

In the following discussion, a "lubrication interval" may be discussed. If a volume or dose of lubricant is fixed or otherwise known, a discussion of a lubrication interval will indirectly indicate what volume of grease is being input into the bearing housing 10 over a given time. For example, if a dose of lubricant is fixed at 5 cc and the lubrication interval is one hour, lubrication will be dispensed at a rate of 5 cc per hour. Decreasing a lubrication interval therefore constitutes increasing a volume of lubricant dispensed over a given time period and thus also constitutes increasing a lubrication rate. As used herein, "lubrication rate" refers to a rate over a relatively long time period as compared to the time required for a given dose of lubricant to exit the lubrication pump, over one hour, for example, and not to an instantaneous rate at which the lubricant leaves the pump. Thus dispensing 5 cc of lubricant once per hour and dispensing one cc of lubricant every 12 minutes constitutes the same lubrication rate—5cc per hour. Likewise, dispensing five one-cc doses of lubricant over the course of 30 seconds and repeating this cycle once per hour is also a lubrication rate of 5 cc per hour. Dispensing lubricant at five cc per second for one second is also the same lubrication rate as dispensing lubricant at one cc per second for five seconds as long as each dispensing event occurs, e.g., once per hour.

A wired configuration of the controller 30, lubrication pump 36 and sensor 46 is illustrated FIG. 2. However, one or more of the controller 30, the lubrication pump 36 and the sensor 46 may communicate wirelessly with one another without exceeding the scope of this disclosure. To this end, the controller 30 is shown as having an antenna 31, and the lubrication pump 36 and the sensor 46 can be provided with suitable transmitters and/or receivers and configured to communicate wirelessly with the controller 30 via any of various known wireless communication protocols. It should be understood that any wired connection discussed herein could be replaced with a wireless connection within the scope of the present disclosure.

The sensor 46 may determine the operating speed of the bearing, that is the rotation rate of the shaft 20 either directly, using an encoder (not illustrated) or other structure mounted on the shaft 20 or, alternately, may detect vibrations in the bearing housing 10 and determine a rotation rate from those vibrations. The sensor 46 also includes one or more probes (not illustrated) that extend into the grease in the free volume 26 in the bearing housing 10 to measure the temperature and/or pressure and/or water content of the grease. One or more signals indicative of the measured temperature, pressure, rotation rate and/or moisture content are sent periodically to the controller 30. The signals may be sent at any desirable interval, every 15 seconds, for example, and may comprise digital or analog signals or any combination of signals from which the controller 30 can extract information regarding the conditions sensed by the sensor 30.

The controller 30 may comprise a programmable general purpose computer running software configured to receive signal inputs from the sensor 46 and produce output signals for controlling the lubrication pump 36. The output signals may comprise a single instruction to cause the lubrication pump 36 to cycle and output a fixed volume or dose of grease, or, alternately, the signal produced by the controller 30 may include information for setting the volume of grease to be dispensed in a given dose by the lubrication pump 36 if the lubrication pump 36 is configured to receive and act on such information. As discussed in greater detail below, the controller 30 includes a first memory 60 for storing information about the operating state and lubrication requirements of the bearing assembly 12 and for storing algorithms for producing suitable output signals based on the input signals received from the sensor 30.

Figure 3:
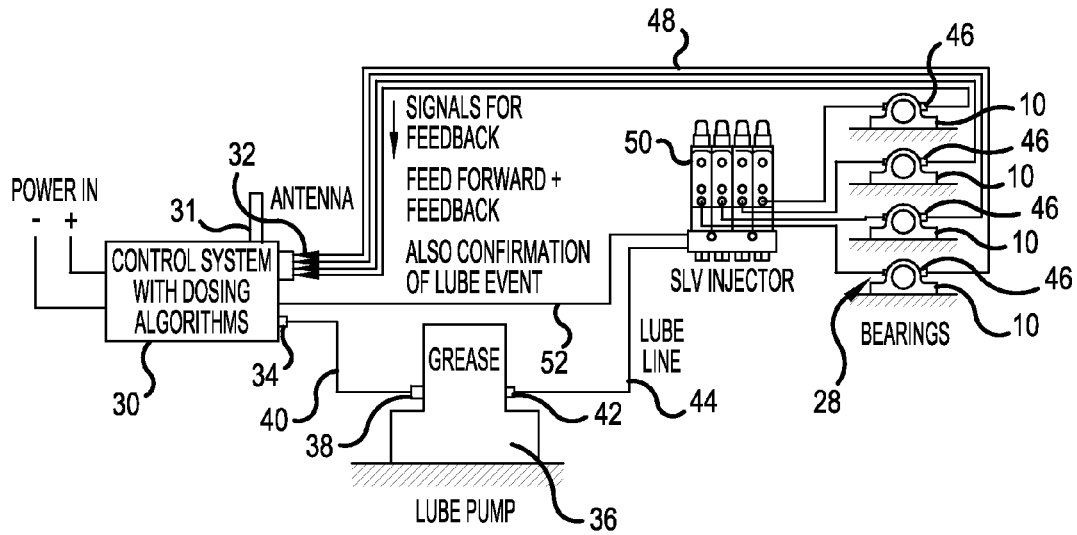
FIG. 3 is a schematic diagram of a second embodiment of a lubrication system according to the present disclosure including multiple bearing housings of FIG. 1.
Figure 4:
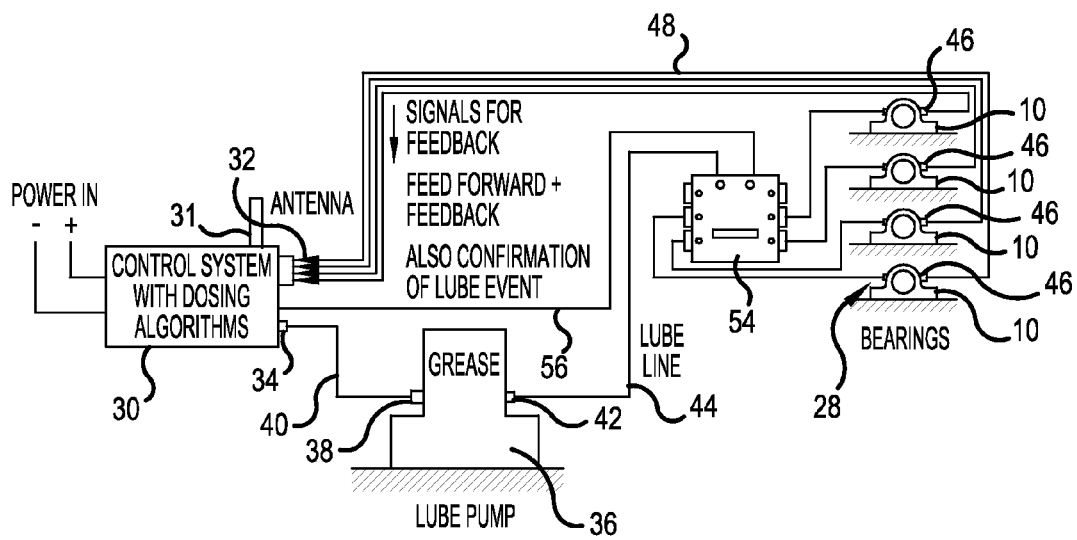
FIG. 4 is a schematic diagram of a third embodiment of a lubrication system according to the present disclosure including multiple bearing housings of FIG. 1.

FIGS. 3 and 4 illustrate two further embodiments of lubrication systems in which the same reference numerals are used to identify elements common to the first embodiment. These embodiments are generally similar to the embodiment of FIG. 2 except that the controller 30 controls the lubrication of multiple bearings housed in multiple bearing housings 10'. FIG. 3 includes an SLV injector 50 which divides and distributes a quantity of grease provided by the lubrication pump 36 to multiple bearing housings 10'—four bearing housings 10' in this example. In order to work effectively with the SLV injector 50, each of the lubrication inlets 28 of the multiple bearing housings 10' includes a valve (not illustrated). The controller 30 may control the lubrication pump 36 as discussed above, and, alternately or in addition, may communicate with the SLV injector 50 via injector communication line 52. When an SLV injector 50 is used that can be adjusted to provide different lubrication amounts to different ones of the bearing housings 10, this control information can be provided by the controller 30.

FIG. 4 illustrates a lubrication system that includes a multi-point lubricator 54. The multipoint lubricator 54 provides greater control over the amount of grease provided to various ones of the multiple bearing housings 10'. The bearing housings 10' are identical to the bearing housings 10' of FIG. 3, and each lubrication inlet 28 in this embodiment also includes a valve (not illustrated). The controller 30 may communicate solely with the lubrication pump 36 as in the first embodiment or may, alternately or in addition, communicate with the multipoint lubricator 54 via multipoint communication line 56 to adjust the dose volume and/or lubrication interval for each of the bearing housings 10.

Figure 5:
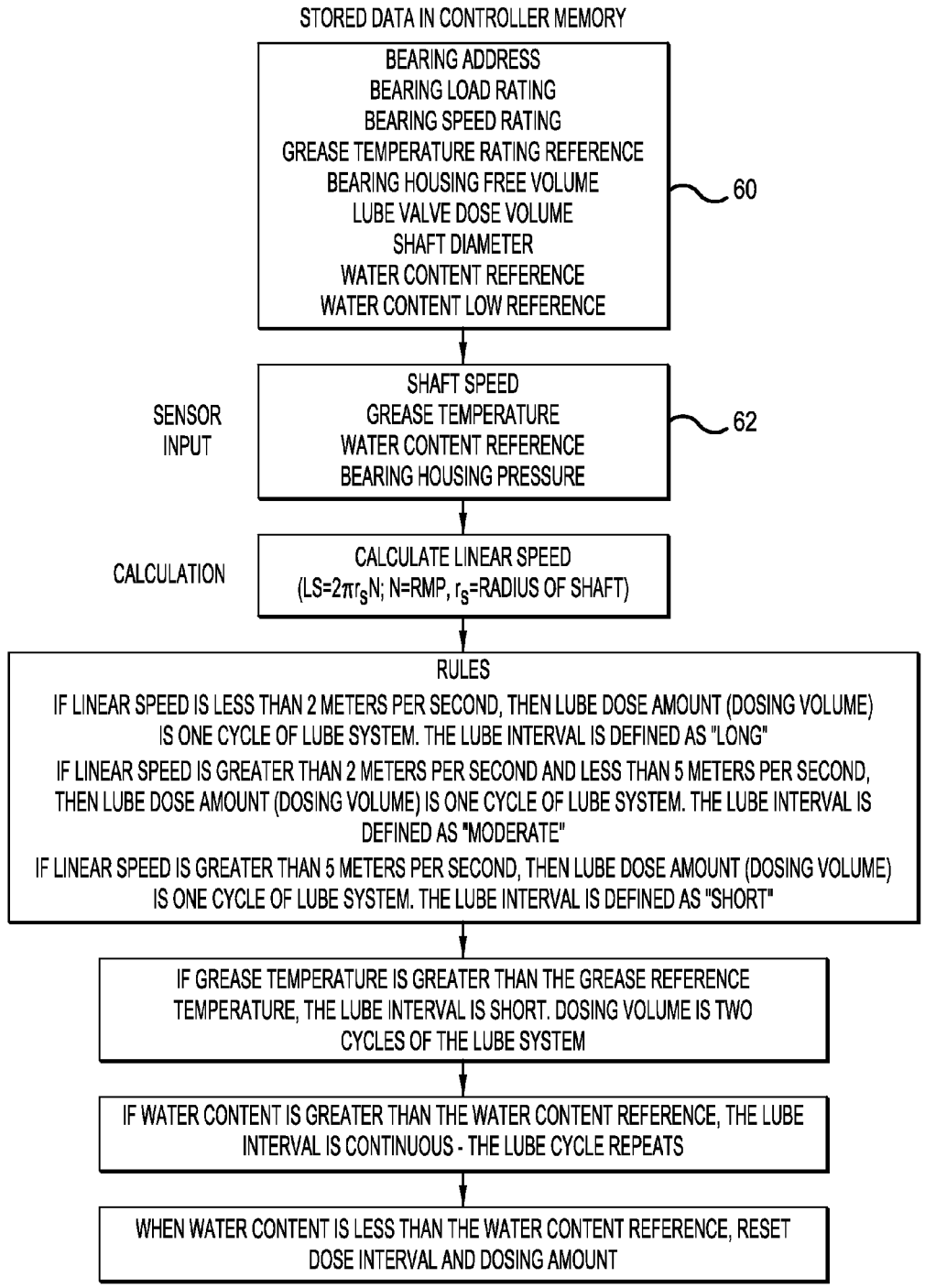
FIG. 5 is a flow chart illustrating a control algorithm for use by a control system of the present disclosure

The operation of the controller 30 will now be discussed in connection with FIG. 5. FIG. 5 illustrates a controller first memory 60 for storing various information that may be useful for controlling the lubrication pump 36. This information may include, without limitation, a bearing address (bearing identifier), a load rating of the bearing, a speed rating of the bearing, a temperature rating of the grease used in the bearing, the free volume of the bearing housing 10, the lubrication dose amount (lubrication dose volume), a shaft diameter, a water content reference value (e.g., a maximum permissible water content) and a water content low reference (an acceptable water content level at which a bearing can operate without damage). This information is determined empirically based on the properties of the lubrication pump 36, the bearing in the bearing housing 10 and the particular grease being used. This information may be input manually into the first memory 60 or obtained from tables or other information stored in memory, or from information downloaded from various sources and can be freely updated or changed based on the particular bearing system being lubricated.

The controller 30 also receives and stores in a second memory 62 (referred to as a "second memory" for ease of description but it may comprise another location in the first memory 60) information received from the sensor 46 including one or more of shaft speed, grease temperature, grease water content and bearing housing pressure. From the information stored in the first memory 60 and the second memory 62, the controller 30 calculates a linear speed of the shaft 20 (2 π times the radius of the shaft times the number of revolutions per minute of the shaft). Linear shaft speed is used rather than a rotation rate in RPM because it is the speed at which the shaft 20 and grease interact at the interface of the shaft 20 and the grease that affects the degradation or breakdown rate of the grease. In other words, a 5 inch shaft operating at 100 RPM will have a higher linear speed at the shaft/grease interface than a 1 inch shaft operating at 100 RPM and will degrade the grease more rapidly.

A variety of rules are then applied based on the stored information in the first memory 60 and the received information in the second memory 62. Examples of useful rules are discussed below. However, it should be understood that these rules will vary based on the properties of the bearing or other system being lubricated, the properties of the grease being used, and how the interactions of the system and the grease affect the degradation rate of the grease.

As a first example of a rule for adjusting lubrication based on factors that affect the degradation rate of the grease, the lubrication rate may be adjusted as a first continuous function of shaft speed for temperatures below a given level (e.g., 30° C.) and as a second continuous function of shaft speed for temperatures above the given level. Such a function may be, for example, setting the lubrication interval in hours to be equal to 7.5 divided by the linear shaft speed in meters per second. Thus, when the controller 30 determines from a sensor signal that the linear shaft speed is 2.5 meters per second, the controller 30 calculates a lubrication interval of 7.5/2.5=3 hours and causes the lubrication pump 36 to dispense grease at this rate. If the shaft speed is highly variable, the controller 30 may calculate an average speed over a period of time, such as one hour, and use that average shaft speed as the shaft speed in the function discussed above.

This first function is used as long as the temperature of the grease remains below the given level. When the sensor 46 sends a signal to the controller 30 indicating that the temperature of the grease has risen above the given level, the lubrication rate should be increased. This is because grease degradation rate is affected by the operating temperature of the grease, and as the grease heats up, more grease must be provided to maintain the lubricating properties of the grease in the free volume 26 of the bearing housing 10. The higher volume of grease forces out some of the grease that has begun to degrade (through the pressure relief) and thus maintains a higher percentage of newer, "un-degraded" grease in the bearing housing 10. When the grease temperature exceeds the given temperature, for example, the lubrication rate may be doubled. This may be accomplished by shifting to a second function, such as 3.75 divided by linear shaft speed in meters per second. Alternately, the first function (7.5/shaft speed) may be used and the volume of lubricant dispensed may be doubled. Stated differently, at temperatures above the given temperature, the lubrication pump 36 may be controlled to dispense two doses of grease every 3 hours instead of one dose of grease every three hours. The lubrication rate is again calculated based on the first function when the temperature of the grease falls below the given temperature. If the shaft speed is highly variable, the controller may calculate an average speed over a period of time, such as one hour, and use that average shaft speed as the shaft speed in the function discussed above.

It is also possible to set the lubrication rate using a non-linear function of shaft speed. This may be appropriate if the degradation rate of certain greases changes in a non-linear manner with respect to shaft speed, that is, if e.g., doubling the shaft speed more than doubles the grease degradation rate. In such a case, a function such as 20 divided by the square (or other power) of the shaft speed may be used. For a shaft speed of 2.5 meters per second, therefore, the lubrication rate would be set to $20/(2.5)2$ or once every 3.2 hours. Again, the lubrication rate will be halved or the number of doses of lubricant will be doubled when the sensor 46 indicates that the temperature of the lubricant is above the given level, and this shorter lubrication rate will be maintained as long as the temperature is above the given level.

The lubrication rate may also be set using a discontinuous function or a series of functions, one of which is selected for different ranges of shaft speeds (corresponding to different degradation rates of the lubricant). For example, a first function could be applied when the shaft speed is less than, e.g., 2 meters per second, referred to as a "long" interval in FIG. 5 (also a "slow" degradation rate), a second function could be applied when the shaft speed is between 2.5 and 5 meters per second, referred to as a "moderate" lubrication interval in FIG. 5 (also a "moderate" degradation rate), and a third function could be used for shaft speeds greater than 5 meters per second, referred to as a "short" interval in FIG. 5 (also a "fast" degradation rate). These different functions could be, for example, different linear functions, different non-linear functions, or a combination of the two.

The functions used to establish the lubrication interval (lubrication rate) and/or the dose amount are not limited to the foregoing and will be selectable by persons of ordinary skill in the art based on factors that affect the degradation rate of the grease.

Grease is quickly degraded when water enters the free volume 26. Many greases can absorb a certain amount of water without significantly affecting their lubricating properties. However, above a certain moisture content, the lubricating properties of grease decrease significantly. The controller 30 therefore controls the lubrication pump 30 in a different manner when the signal provided by the sensor 46 indicates that the moisture content of the grease has exceeded a predetermined level, 15% for example. In that case, the controller 30 shifts the lubrication pump into a continuous or substantially continuous mode of operation. "Substantially continuous" may constitute cycling the lubrication pump to provide repeated doses of grease at short intervals of, for example, one second. In this mode of operation, the additional grease will increase the pressure in the bearing housing 10 and cause the water-degraded grease to be released through the pressure release valve. This forces out the water contaminated grease and replaces it with fresh grease.

The controller 30 may be configured to cause the lubrication pump 36 to cycle until the sensor 46 determines that the moisture content of the grease has dropped below the given level or dropped to a second level lower than the predetermined level, 5%, for example. Alternately, the controller 30 may cause the lubrication pump to add a known volume of grease to the free volume 26 under the assumption that adding a given volume of grease will drive out a sufficient quantity of the water-containing grease to reduce the water content of the grease without requiring an actual measurement of the water content. The volume of grease added may be equal to, for example, 100 percent of the free volume 26. The grease in the bearing housing 10 churns as the bearing assembly 12 operates, and the new grease mixes with the water-contaminated grease as the new grease is added. However, it may be assumed that adding some quantity of fresh grease will decrease the overall water content of the grease sufficiently to allow adequate lubrication. Thus, a method may include determining that the water content has exceeded 15%, adding a volume of fresh grease equal to 100% of the free volume 26 to the bearing housing 10, and then returning to using the lubrication function indicated by the shaft speed and grease temperature.

Figure 6:
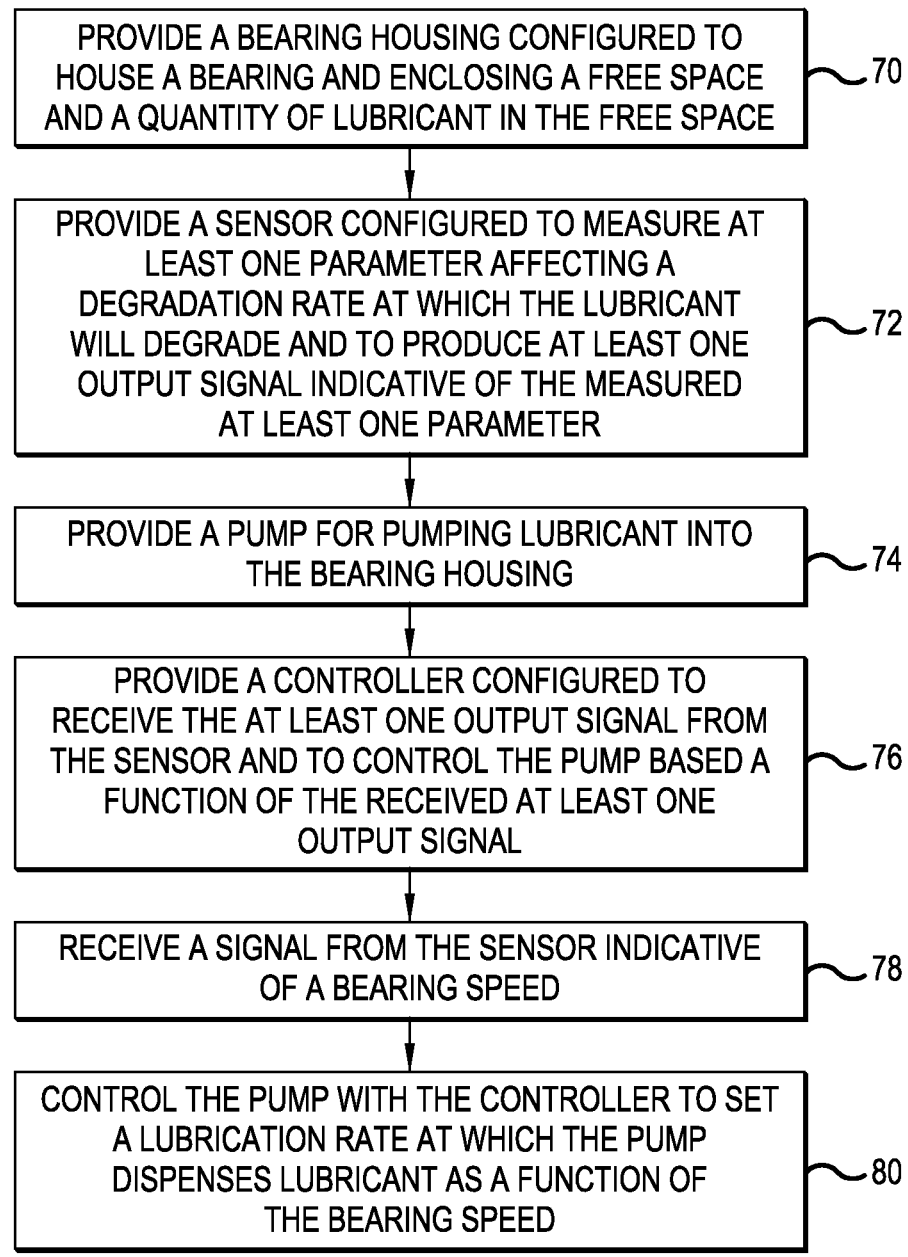
FIG. 6 is a flow chart illustrating a first method according to the present disclosure.

Several methods of controlling a lubrication system are discussed below. FIG. 6 illustrates a method that includes a step 70 of providing a bearing housing configured to house a bearing and enclosing a free volume for receiving lubricant, a step 72 of providing a sensor configured to measure at least one parameter affecting a degradation rate at which the lubricant will degrade and to produce at least one output signal indicative of the measured at least one parameter, a step 74 of providing a pump for pumping lubricant into the bearing housing, a step 76 of providing a controller configured to receive the at least one output signal from the sensor and to control the pump based the received at least one output signal, a step 78 of receiving a signal from the sensor indicative of a bearing speed, and a step 80 of controlling the pump with the controller to set a lubrication interval (lubrication rate) at which the pump dispenses lubricant as a function of the bearing speed.

Figure 7:
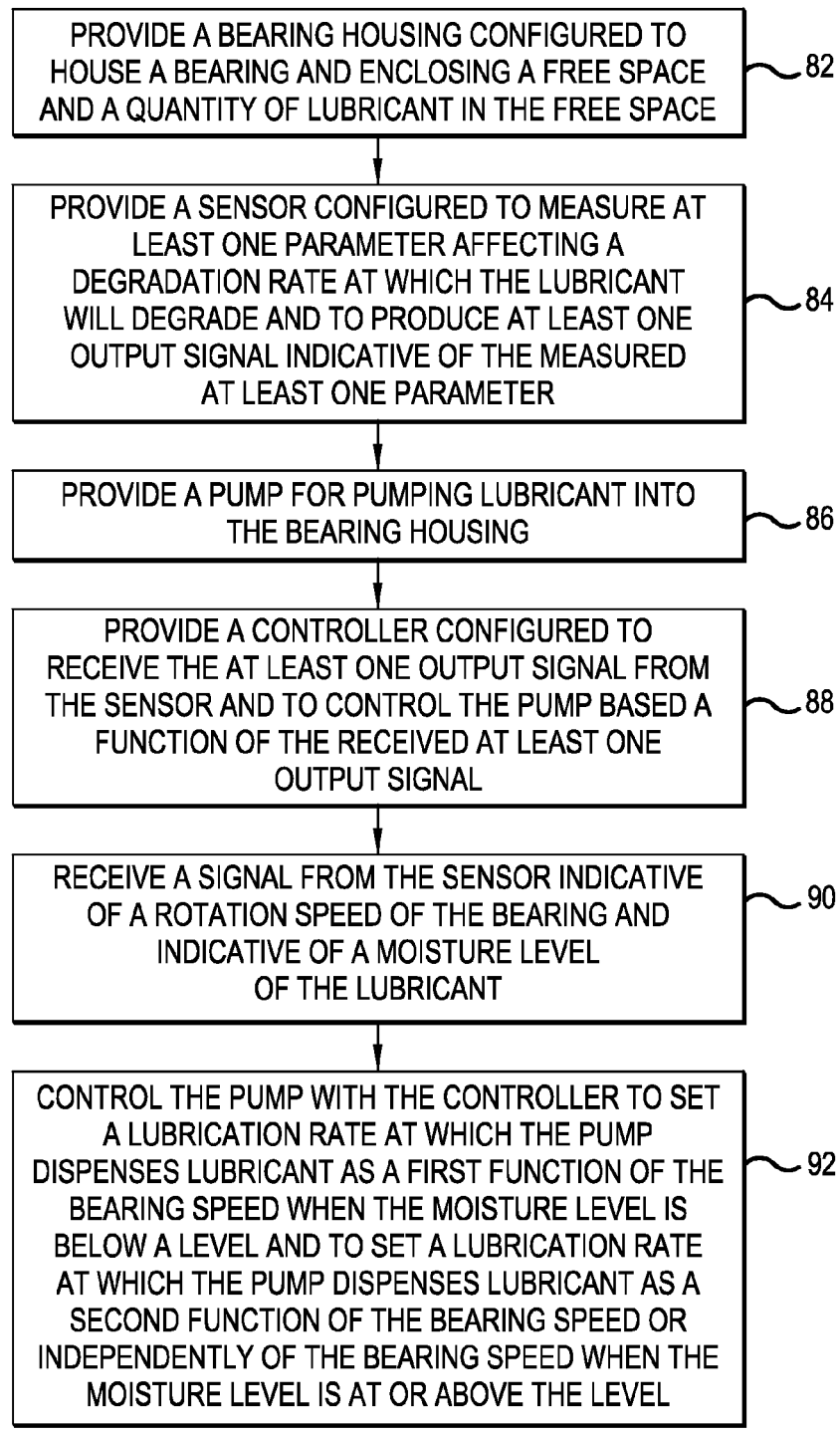
FIG. 7 is a flow chart illustrating a second method according to the present disclosure.

FIG. 7 illustrates a method that includes a step 82 of providing a bearing housing configured to house a bearing and enclosing a free volume for receiving lubricant, a step 84 of providing a sensor configured to measure at least one parameter affecting a degradation rate at which the lubricant will degrade and to produce at least one output signal indicative of the measured at least one parameter, a step 86 of providing a pump for pumping lubricant into the bearing housing, a step 88 of providing a controller configured to receive the at least one output signal from the sensor and to control the pump based the received at least one output signal, a step 90 of receiving a signal from the sensor indicative of a rotation speed of the bearing and indicative of a moisture level of the lubricant, and a step 92 of controlling the pump with the controller to set a lubrication interval (lubrication rate) at which the pump dispenses lubricant as a first function of the bearing speed when the moisture level is below a level and to set a lubrication interval (lubrication rate) at which the pump dispenses lubricant independently of the bearing speed when the moisture level is at or above the level.

Figure 8:
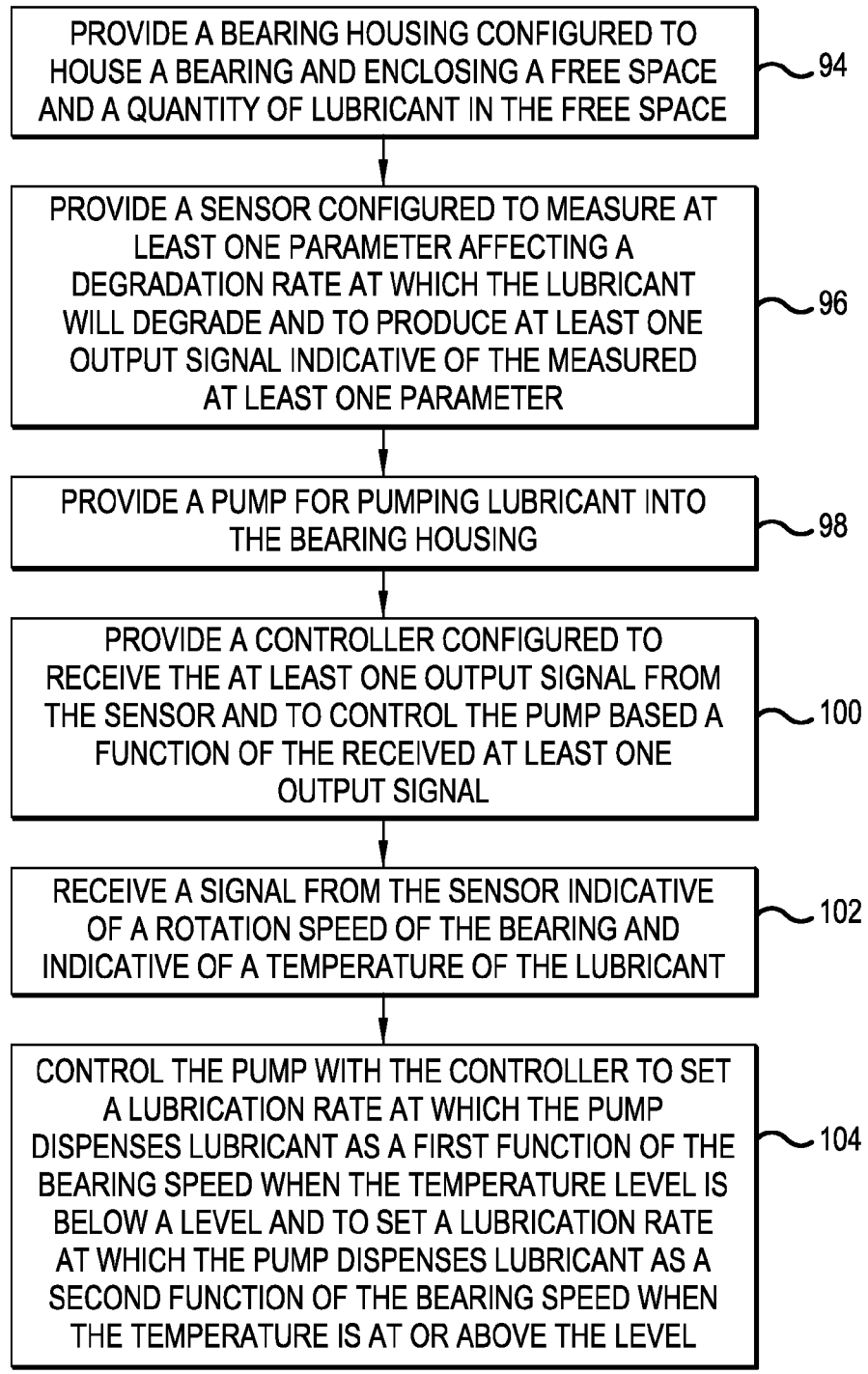
FIG. 8 is a flow chart illustrating a third method according to the present disclosure.

FIG. 8 illustrates yet another method according to the disclosure that includes a step 94 of providing a bearing housing configured to house a bearing and enclosing a free volume for receiving lubricant, a step 96 of providing a sensor configured to measure at least one parameter affecting a degradation rate at which the lubricant will degrade and to produce at least one output signal indicative of the measured at least one parameter, a step 98 of providing a pump for pumping lubricant into the bearing housing, a step 100 of providing a controller configured to receive the at least one output signal from the sensor and to control the pump based the received at least one output signal, a step 102 of receiving a signal from the sensor indicative of a rotation speed of the bearing and indicative of a temperature of the lubricant, and a step 104 of controlling the pump with the controller to set a lubrication interval (lubrication rate) at which the pump dispenses lubricant as a first function of the bearing speed when the temperature level is below a level and to set a lubrication interval (lubrication rate) at which the pump dispenses lubricant as a second function of the bearing speed when the temperature is at or above the level.

The present invention has been disclosed herein in terms of several presently preferred embodiments. Additions and modifications to these embodiments will become apparent to persons of ordinary skill in the art upon a reading of the foregoing description. All modifications and additions are intended to constitute part of the disclosed invention to the extent they are included within the scope of the several claims appended hereto.

What is claimed is:

1. A method comprising:
   providing a bearing housing configured to house a bearing, the bearing housing enclosing a free volume for receiving lubricant;
   providing a quantity of the lubricant in the free volume;
   providing at least one sensor configured to measure at least one parameter affecting a degradation rate at which the lubricant will degrade and to produce at least one output signal indicative of the measured at least one parameter, wherein the at least one parameter comprises a speed of the bearing and a moisture content of the lubricant;
   providing a pump for pumping lubricant into the bearing housing;
   providing a controller configured to receive the at least one output signal from the sensor and configured to control the pump based the received at least one output signal; and
   controlling the pump based on a function of the received at least one output signal.

2. The method of claim 1, including determining, based on the at least one measured parameter the degradation rate of the lubricant, wherein controlling the pump comprises causing the pump to pump lubricant into the bearing housing based on the determined degradation rate.

3. The method of claim 2, wherein the at least one parameter affecting a rate at which the lubricant will degrade comprises a rotation speed of a shaft supported by the bearing.

4. The method of claim 2, wherein the controller is configured to receive as an input a shaft speed signal indicative of a rotation speed of the shaft and a moisture signal indicative of a moisture level of the lubricant and to set a lubrication rate at which the pump dispenses lubricant as a first function of the shaft speed when the moisture level is below a second level and to set a lubrication interval at which the pump dispense lubricant as a second function of the shaft speed or independently of the shaft speed when the moisture level is at or above the second level.

5. The method of claim 2, wherein the controller is configured to receive as an input a shaft speed signal indicative of a rotation speed of the shaft and a lubricant temperature signal indicative of a temperature of the lubricant and to set a lubrication rate at which the pump dispenses lubricant as a first function of the shaft speed in response to a determination that the temperature is below a first level and to set the lubrication rate at which the pump dispenses lubricant as a second function of the shaft speed in response to a determination that the temperature is at or above the first level.

6. The method of claim 2, wherein the controller is configured to receive as an input a shaft speed signal indicative of a rotation speed of the shaft and a lubricant temperature signal indicative of a temperature of the lubricant and a moisture signal indicative of a moisture level of the lubricant and to set a lubrication rate at which the pump dispenses lubricant as a first function of the shaft speed in response to a determination that the temperature is below a first level and the moisture level is below a second level and to set the lubrication rate at which the pump dispenses lubricant as a second function of the shaft speed in response to a determination that the temperature is at or above the first level and the moisture level is below the second level and to set a lubrication rate as a third function of the shaft speed or independently of the shaft speed in response to a determination that the moisture level is at or above the second level.

7. The method of claim 1, wherein the at least one parameter comprises lubricant temperature.

8. The method of claim 1 wherein the sensor comprises a moisture sensor configured to continuously or periodically sense a moisture content of the lubricant and pumping the lubricant into the bearing housing at a first rate in response to a determination that the moisture content is below a first level and the pumping lubricant into the bearing housing at a second rate, greater than the first rate, in response to a determination that the moisture content is at or above the first level.

9. The method of claim 1, wherein the controller is configured to receive as an input a shaft speed signal indicative of a rotation speed of the shaft.

10. The method of claim 1, wherein the controller is configured to receive as an input a shaft speed signal indicative of a rotation speed of the shaft and a moisture signal indicative of a moisture level of the lubricant and to set a lubrication rate at which the pump dispenses lubricant as a first function of the shaft speed when the moisture level is below a second level and to set a lubrication rate at which the pump dispense lubricant as a second function of the shaft speed or independently of the shaft speed when the moisture level is at or above the second level.

11. The method of claim 1, wherein the controller is configured to receive as an input a shaft speed signal indicative of a rotation speed of the shaft and a lubricant temperature signal indicative of a temperature of the lubricant and to set a lubrication rate at which the pump dispenses lubricant as a first function of the shaft speed in response to a determination that the temperature is below a first level and to set the lubrication rate at which the pump dispenses lubricant as a second function of the shaft speed in response to a determination that the temperature is at or above the first level.

12. The method of claim 1, wherein the controller is configured to receive as an input a shaft speed signal indicative of a rotation speed of the shaft and a lubricant temperature signal indicative of a temperature of the lubricant and a moisture signal indicative of a moisture level of the lubricant and to set a lubrication rate at which the pump dispenses lubricant as a first function of the shaft speed in response to a determination that the temperature is below a first level and the moisture level is below a second level and to set the lubrication rate at which the pump dispenses lubricant as a second function of the shaft speed in response to a determination that the temperature is at or above the first level and the moisture level is below the second level and to set a lubrication rate as a third function of shaft speed or independently of the shaft speed in response to a determination that the moisture level is at or above the second level.

13. A method comprising:
   providing a bearing housing configured to house a bearing, the bearing housing enclosing a free volume for receiving lubricant;
   providing a quantity of the lubricant in the free volume;
   providing a sensor configured to measure at least one parameter affecting a degradation rate at which the lubricant will degrade and to produce at least one output signal indicative of the measured at least one parameter;

providing a pump for pumping lubricant into the bearing housing;

providing a controller configured to receive the at least one output signal from the sensor and configured to control the pump based the received at least one output signal;

controlling the pump based on a function of the received at least one output signal, and determining, based on the at least one measured parameter the degradation rate of the lubricant, wherein controlling the pump comprises causing the pump to pump lubricant into the bearing housing based on the determined degradation rate, wherein the at least one parameter affecting a rate at which the lubricant will degrade comprises a property of the lubricant, and wherein the at least one parameter comprises a moisture content of the lubricant.

14. A method comprising:

providing a bearing housing configured to house a bearing, the bearing housing enclosing a free volume for receiving lubricant;

placing the lubricant in the free volume;

providing a sensor configured to measure a moisture content of the lubricant and to produce at least one output signal indicative the measured moisture content;

providing a pump for pumping lubricant into the bearing housing;

providing a controller configured to receive the at least one output signal from the sensor, determine from the at least one output signal whether the moisture level is above or below a first level and control the pump based on the determined moisture level, and pumping lubricant into the bearing housing at a first rate in response to a determination that the moisture content is below a first level and pumping lubricant into the bearing housing at a second rate, greater than the first rate, in response to a determination that the moisture content is at or above the first level.

15. The method of claim 14, wherein pumping lubricant into the bearing housing at the second rate comprises pumping lubricant into the housing at the second rate until the moisture content of the lubricant falls below the first level.

\* \* \* \* \*

UNITED STATES PATENT AND TRADEMARK OFFICE
CERTIFICATE OF CORRECTION

PATENT NO. : 9,695,979 B2  
APPLICATION NO. : 14/580824  
DATED : July 4, 2017  
INVENTOR(S) : Paul George Conley et al.

Page 1 of 1

It is certified that error appears in the above-identified patent and that said Letters Patent is hereby corrected as shown below:

In the Claims

Column 9, Line 26, insert -- on -- after "based"

Column 11, Line 8, insert -- on -- after "based"

Signed and Sealed this
Sixth Day of November, 2018

Andrei Iancu
*Director of the United States Patent and Trademark Office*